(12) United States Patent
Kannan et al.

(10) Patent No.: US 9,047,198 B2
(45) Date of Patent: Jun. 2, 2015

(54) PREFETCHING ACROSS PAGE BOUNDARIES IN HIERARCHICALLY CACHED PROCESSORS

(71) Applicant: Apple Inc., Cupertino, CA (US)

(72) Inventors: Hari S. Kannan, Sunnyvale, CA (US); Pradeep Kanapathipillai, Santa Clara, CA (US); Brian P. Lilly, San Francisco, CA (US); Perumal R. Subramoniam, San Jose, CA (US); Mahnaz Sadoughi-Yarandi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 13/689,696

(22) Filed: Nov. 29, 2012

(65) Prior Publication Data

US 2014/0149632 A1 May 29, 2014

(51) Int. Cl.
| | |
|---|---|
| G06F 12/00 | (2006.01) |
| G06F 12/08 | (2006.01) |
| G06F 13/00 | (2006.01) |
| G06F 13/28 | (2006.01) |
| G06F 9/26 | (2006.01) |
| G06F 9/34 | (2006.01) |
| G06F 12/10 | (2006.01) |

(52) U.S. Cl.
CPC ........ G06F 12/0862 (2013.01); G06F 12/0811 (2013.01); G06F 12/1027 (2013.01); G06F 2212/654 (2013.01)

(58) Field of Classification Search
CPC ............ G06F 12/0862; G06F 12/0811; G06F 12/1027; G06F 2212/654
USPC ...................................... 711/3, 122, 137, 205
See application file for complete search history.

(56) References Cited

U.S. PATENT DOCUMENTS

| | | |
|---|---|---|
| 4,796,232 A | 1/1989 | House |
| 5,440,713 A | 8/1995 | Lin et al. |
| 5,509,136 A | 4/1996 | Korekata et al. |
| 5,630,096 A | 5/1997 | Zuravleff et al. |
| 5,664,153 A | 9/1997 | Farrell |
| 5,666,494 A | 9/1997 | Mote, Jr. |
| 5,717,874 A | 2/1998 | Ishiwata |
| 5,736,870 A | 4/1998 | Greason et al. |
| 5,745,913 A | 4/1998 | Pattin et al. |

(Continued)

OTHER PUBLICATIONS

Fei Gao, Hanyu Cui, Suleyman Sair, "Two-level Data Prefetching", MathWorks, Inc., 2007.*

(Continued)

*Primary Examiner* — Matthew Bradley
*Assistant Examiner* — Rocio Del Mar Perez-Velez
(74) *Attorney, Agent, or Firm* — Rory D. Rankin; Meyertons, Hood, Kivlin, Kowert & Goetzel, P.C.

(57) ABSTRACT

Processors and methods for preventing lower level prefetch units from stalling at page boundaries. An upper level prefetch unit closest to the processor core issues a preemptive request for a translation of the next page in a given prefetch stream. The upper level prefetch unit sends the translation to the lower level prefetch units prior to the lower level prefetch units reaching the end of the current page for the given prefetch stream. When the lower level prefetch units reach the boundary of the current page, instead of stopping, these prefetch units can continue to prefetch by jumping to the next physical page number provided in the translation.

24 Claims, 11 Drawing Sheets

(56) References Cited

U.S. PATENT DOCUMENTS

| | | |
|---|---|---|
| 5,761,706 A | 6/1998 | Kessler et al. |
| 5,784,582 A | 7/1998 | Hughes |
| 5,860,117 A | 1/1999 | Cherabuddi |
| 5,920,898 A | 7/1999 | Bolyn et al. |
| 5,983,325 A | 11/1999 | Lewchuk |
| 6,000,019 A | 12/1999 | Dykstal et al. |
| 6,026,464 A | 2/2000 | Cohen |
| 6,035,387 A | 3/2000 | Hsu et al. |
| 6,047,001 A | 4/2000 | Kuo et al. |
| 6,085,291 A | 7/2000 | Hicks et al. |
| 6,092,158 A | 7/2000 | Harriman et al. |
| 6,104,417 A | 8/2000 | Nielsen et al. |
| 6,212,612 B1 | 4/2001 | Turner |
| 6,226,721 B1 | 5/2001 | Strongin et al. |
| 6,253,297 B1 | 6/2001 | Chauvel et al. |
| 6,260,123 B1 | 7/2001 | Strongin et al. |
| 6,363,460 B1 | 3/2002 | Jeddeloh |
| 6,396,729 B1 | 5/2002 | Norman et al. |
| 6,510,497 B1 | 1/2003 | Strongin et al. |
| 7,689,774 B2 | 3/2010 | O'Connell et al. |
| 7,886,112 B2 | 2/2011 | Ohtsuka |
| 2005/0086595 A1 | 4/2005 | Campbell et al. |
| 2006/0179236 A1 | 8/2006 | Shafi |
| 2006/0248279 A1* | 11/2006 | Al-Sukhni et al. ............ 711/137 |
| 2007/0106848 A1 | 5/2007 | Krishnaiyer et al. |
| 2009/0119488 A1 | 5/2009 | Kadambi et al. |

OTHER PUBLICATIONS

Intel Corporation, "Accelerated Graphics Port Interface Specification", Revision 1.0 (Jul. 31, 1996), pp. ii-x and 1-151.

* cited by examiner

| Physical Page Number 92 | Line 94 | Stride 96 | Stream ID 98 | Zombie Indicator 100 |

Prefetch Request 90

FIG. 7

| Stream ID 102 | Stride 104 | Temporal 106 | Page Size 108 | Stream Type 110 | Demand Address 112 | Prefetch Address 114 | Next Page Number 116 |
|---|---|---|---|---|---|---|---|
| 0x1 | 0x4 | 0 | 64 KB | Load | 0x00AB | 0x00AF | 0x2B |
| 0x2 | 0x1 | 0 | 16 KB | Store | 0xF24D | 0xF251 | 0x63 |
| ... | ... | ... | ... | ... | ... | ... | ... |

Prefetch Table 76

FIG. 8

PREFETCHING ACROSS PAGE BOUNDARIES IN HIERARCHICALLY CACHED PROCESSORS

BACKGROUND

1. Field of the Invention

The present invention relates generally to cache performance, and in particular to methods and mechanisms for prefetching data in processors with multiple levels of caches.

2. Description of the Related Art

Memory latency is frequently a large factor in determining the performance (e.g., instructions executed per second) of a processor in a given system. While the operating frequencies of processors have increased dramatically over time, the latency for access to dynamic random access memory (DRAM) in a typical system has not decreased at the same rate. Consequently, the number of processor clock cycles required to access external memory has increased. In order to compensate for the relatively low speed of memory devices, various techniques have been developed.

One commonly used technique for reducing data access latency is caching data in one or more caches located close to the processor. Caches are typically relatively small, low latency, memories incorporated into the processor or coupled nearby. Another approach used to mitigate the impact of memory access latencies on processor performance is to prefetch data into a cache. The term "prefetch" may generally refer to the fetching of data from memory before that data is actually needed for computation by instructions in the program. One way that the memory bandwidth may be effectively utilized is to predict the information that will be accessed soon and then prefetch that information from the memory system into the cache. If the prediction is correct, the information may be a cache hit at the time of the actual request and thus the effective memory latency for actual requests may be decreased. On the other hand, if the prediction is incorrect, the prefetched information may replace useful information in the cache, causing more cache misses to be experienced than if prefetching were not employed and thus increasing the effective memory latency.

Certain types of computer programs process long sequences of data where each element in the sequence is accessed only once. This type of access pattern usually results in cache misses since the required data is not in the cache at the time it is needed. This type of access may be referred to as a "data stream" or "stream", which is prevalent in certain multimedia applications. Prefetching data based on a prediction of the stream may help prevent cache misses and improve processor efficiency.

Prefetching is commonly employed for hiding memory latency in applications that have large data footprints. Many state-of-the-art microprocessors use multiple prefetch units, one or more at each cache level, in order to get fine-grained control over data placement. These prefetch units are typically tuned to be more aggressive as their proximity to the core decreases, such that the lower-level cache prefetch units run significantly ahead of the upper-level prefetch units closest to the core. As used herein, the term "lower-level prefetch units" refers to prefetch units further away from the core (e.g., level two (L2) prefetch unit, level three (L3) prefetch unit), while the term "upper-level prefetch unit" may refer to prefetch units closer to the core (e.g., level one (L1) prefetch unit).

Processors often utilize a virtual address space for data stored in the system memory, and software processes may divide the virtual address space into pages of a prefixed size. Mappings (or translations) of virtual addresses to physical addresses may keep track of where virtual pages are located in the physical memory. These mappings may be stored in a page table and this page table may be stored in memory. A translation lookaside buffer (TLB) may be utilized to store a subset of the mappings/translations.

Since the lower-level prefetch units require knowledge of physical addresses but do not have a means of obtaining the translation for the next virtual page accessed by the stream, the lower-level prefetch units typically have to stall at page-boundaries. Therefore, such processors may not reap the full benefits of prefetching for streams that cross page boundaries.

FIG. 1 illustrates the problem faced by the prior art. The relative locations of a demand stream, a L1 prefetch stream, and a L2 prefetch stream at a given time within a physical page in memory are shown in FIG. 1. The dashed vertical lines labeled with "Byte 0" and "Byte 4096" indicate the page boundaries. The demand stream fetches data from a location in the page where data is needed for immediate consumption by the program. The L1 prefetch stream tries to stay ahead of the demand stream by a certain number of bytes so that the demand stream will hit in the L1 cache. Similarly, the L2 prefetch stream tries to stay ahead of the L1 prefetch stream by a certain number of bytes so that the L1 prefetch stream will hit in the L2 cache for its prefetches. In one embodiment, data may be fetched from the page on a cache line basis, and the L1 prefetch stream may be a fixed number of cache lines ahead of the demand stream and the L2 prefetch stream may be a fixed number of cache lines ahead of the L1 prefetch stream.

When the L2 prefetch stream reaches the end of the page, as shown in FIG. 1, the L2 prefetch stream will stall while it waits for the physical page number of the next page in the given stream. The L2 prefetch stream may have to wait until the L1 prefetch stream reaches the end of the page, at which point the L1 prefetch unit will request the translation of the next virtual page into a corresponding physical page number. The dashed horizontal line shows the time spent idling by the L2 prefetch stream after the L2 prefetch stream hits the page boundary and waits for the L1 prefetch stream to catch up and reach the page boundary and provide next-page information. This results in "wasted cycles" with the L2 prefetch unit stalling for a certain amount of time while it could be doing useful work. As a result, when the L1 prefetch unit starts fetching from the next page in physical memory, these fetches will miss in the L2 cache because the L2 prefetch unit will not have already prefetched the data from the next page. Therefore, the L1 prefetch unit will incur increased latency as the data referenced by its prefetches needs to be fetched from memory. The L1 prefetch unit will continue to experience increased latency until the L2 prefetch unit is able to catch up with its prefetches in advance of the L1 prefetch unit.

SUMMARY

Systems, processors, and methods for prefetching data are contemplated.

In one embodiment, a hierarchically cached processor may include multiple levels of caches. The hierarchical cache processor may also include any number of cores, and each level of cache may include a prefetch unit configured to prefetch data for the processor. In some embodiments, the prefetch units may be more aggressive in prefetching as their proximity to the processor core(s) decreases. As such, the lower level prefetch units may be further ahead of the upper level prefetch units in the prefetch stream.

In various embodiments, when a lower level prefetch unit reaches a page boundary, the prefetch unit needs to know the physical address of the next page before proceeding. Therefore, before the lower level prefetch units reach a page boundary, the upper level prefetch unit may preemptively generate a prefetch request to retrieve a translation for the next virtual page. Subsequently, after the physical address for the next virtual page has been obtained, the address translation is conveyed to the lower level prefetch unit(s). When the lower level prefetch unit reaches the page boundary, the prefetch units will have the physical address of the next page and may continue prefetching without delay.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 7 is one embodiment of a prefetch request.

FIG. 8 is one embodiment of a prefetch table.

DETAILED DESCRIPTION OF EMBODIMENTS

Figure 1:
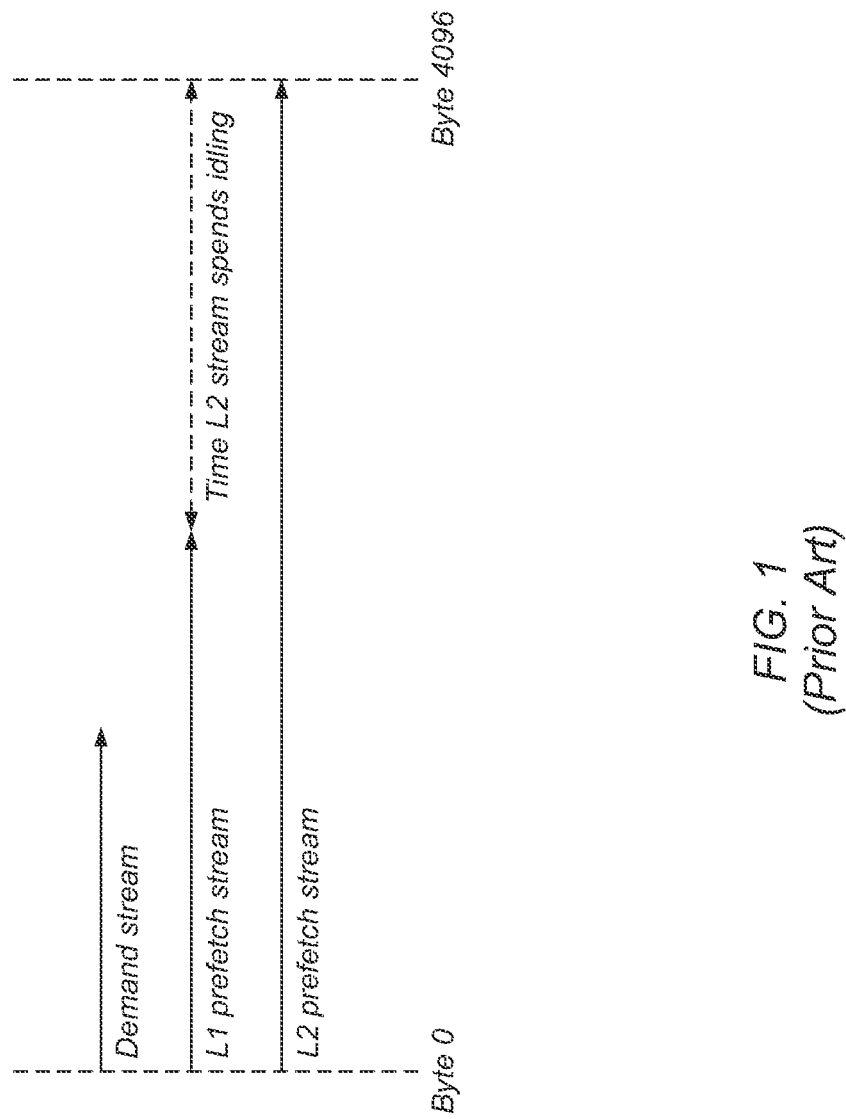
FIG. 1 illustrates a prior art L2 prefetch unit idling at a page boundary.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a prefetch unit . . . ." Such a claim does not foreclose the apparatus from including additional components (e.g., a cache, a memory controller, a bus interface unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 2:
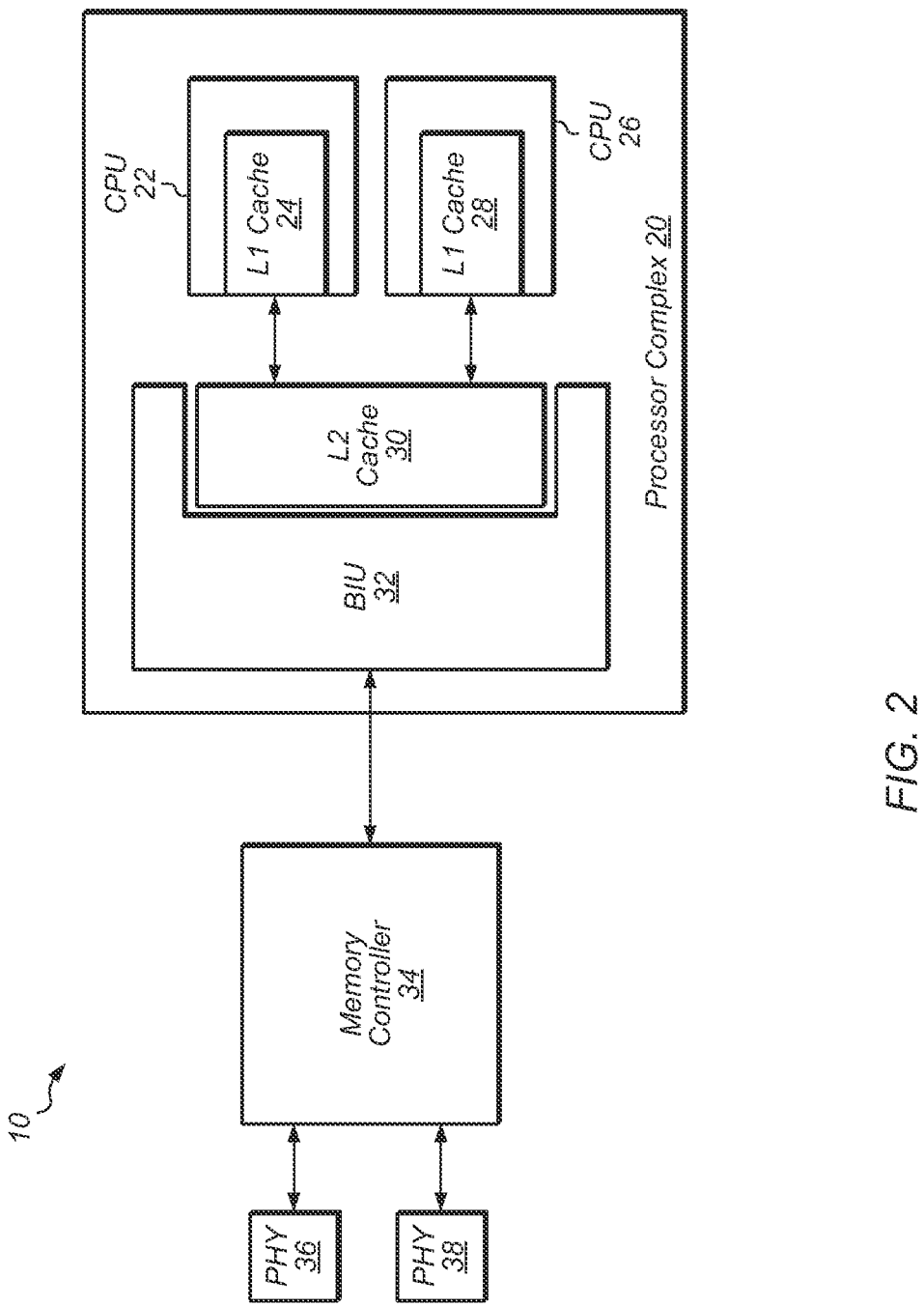
FIG. 2 is a block diagram that illustrates one embodiment of a portion of an IC.

Referring now to FIG. 2, a block diagram illustrating one embodiment of a portion of an integrated circuit (IC) is shown. In the illustrated embodiment, IC 10 includes a processor complex 20, memory controller 34, and memory physical interface circuits (PHYs) 36 and 38. It is noted that IC 10 may also include many other components not shown in FIG. 2. In various embodiments, IC 10 may also be referred to as a system on chip (SoC), an application specific integrated circuit (ASIC), or an apparatus.

Processor complex 20 may include central processing units (CPUs) 22 and 26, level two (L2) cache 30, and bus interface unit (BIU) 32. In other embodiments, processor complex 20 may include other numbers of CPUs. CPUs 22 and 26 may also be referred to as processors or cores. CPUs 22 and 26 may include level one (L1) cache 24 and L1 cache 28, respectively. L1 caches 24 and 28 may be coupled to L2 cache 30, and L2 cache 30 may be coupled to BIU 32, which may be coupled to memory controller 34. Other embodiments may include additional levels of cache (e.g., level three (L3) cache). It is noted that processor complex 20 and CPUs 22 and 26 may include other components not shown in FIG. 2.

The CPUs 22 and 26 may include circuitry to execute instructions defined in an instruction set architecture. Specifically, one or more programs comprising the instructions may be executed by the CPUs 22 and 26. Any instruction set architecture may be implemented in various embodiments. For example, in one embodiment, the ARM™ instruction set may be implemented. In other embodiments, the MIPS™ instruction set, the SPARC™ instruction set, the x86 instruction set (also referred to as IA-32), the IA-64 instruction set, or otherwise may be implemented.

In one embodiment, L2 cache 30 may be configured to cache instructions and data for low latency access by CPUs 22 and 26. The L2 cache 30 may comprise any capacity and configuration (e.g., direct mapped, set associative). In one embodiment, L2 cache 30 may be configured as a set-associative, writeback cache that is fully inclusive of L1 caches 24 and 28 within CPUs 22 and 26, respectively. In various embodiments, L2 cache 30 may include a variety of structures configured to support cache functionality and performance. For example, L2 cache 30 may include a miss buffer configured to store requests that miss the L2, a fill buffer configured to temporarily store data, a writeback buffer configured to temporarily store dirty evicted data and snoop copyback data, and/or a snoop buffer configured to store snoop requests. In some embodiments, L2 cache 30 may include a crossbar (not shown) for managing data flow between L2 cache 30 and BIU 32 and between L2 cache 30 and CPUs 22 and 26. In various embodiments, L2 cache 30 may implement arbitration logic to prioritize cache access among various cache read and write requestors. Other variations of L2 cache 30 configurations are possible and contemplated. L2 cache 30 may be coupled to memory controller 34 via BIU 32. BIU 32 may also include various other logic structures to couple CPUs 22 and 26 and L2 cache 30 to various other devices and blocks.

Memory controller 34 may include any number of memory ports and may include circuitry configured to interface to memory. For example, the memory controller 34 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 34 may also be coupled to memory physical interface circuits (PHYs) 36 and 38. Memory PHYs 36 and 38 are representative of any number of memory PHYs which may be coupled to memory controller 34. The memory PHYs 36 and 38 may be configured to interface to memory devices (not shown).

It is noted that other embodiments may include other combinations of components, including subsets or supersets of the components shown in FIG. 2 and/or other components. While one instance of a given component may be shown in FIG. 2, other embodiments may include two or more instances of the given component. Similarly, throughout this detailed description, two or more instances of a given component may be included even if only one is shown, and/or embodiments that include only one instance may be used even if multiple instances are shown.

Figure 3:
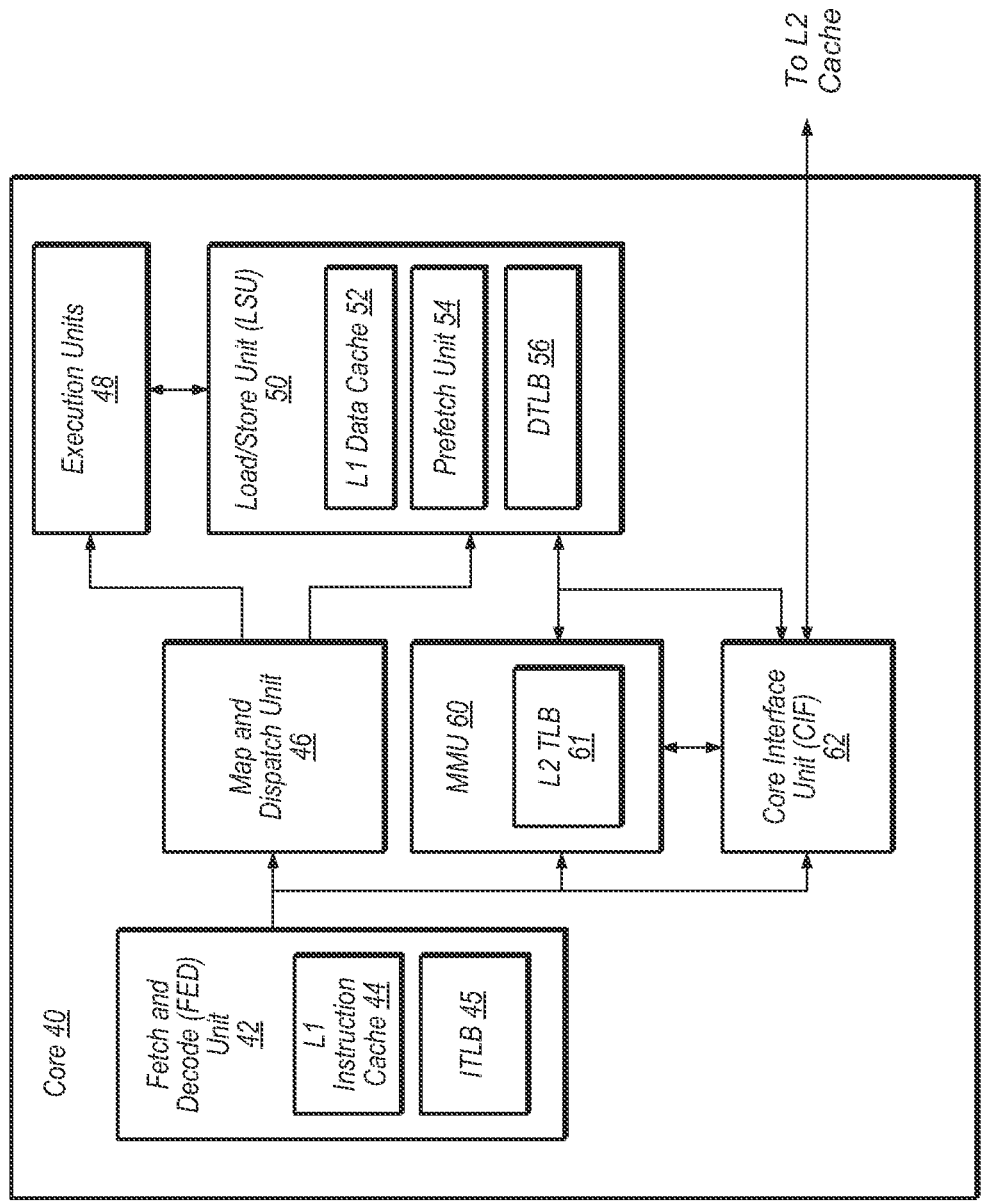
FIG. 3 is a block diagram that illustrates one embodiment of a processor core.

Turning now to FIG. 3, one embodiment of a processor core is shown. Core 40 is one example of a processor core, and core 40 may be utilized within a processor complex, such as processor complex 20 of FIG. 2. In one embodiment, each of CPUs 22 and 26 of FIG. 2 may include the components and functionality of core 40. Core 40 may include fetch and decode (FED) unit 42, map and dispatch unit 46, execution units 48, load/store unit (LSU) 50, memory management unit (MMU) 60, and core interface unit (CIF) 62. It is noted that core 40 may include other components not shown in FIG. 2.

FED unit 42, which includes the L1 instruction cache 44 and instruction translation lookaside buffer (ITLB) 45, may be configured to fetch instructions from memory (or the L2 cache) and decode the fetched instructions. Decoded instructions may be conveyed to the map and dispatch unit 46. Map and dispatch unit 46 may be configured to map decoded instructions to physical registers. Map and dispatch unit 46 may also be configured to dispatch instructions to execution units 48 and LSU 50. Execution units 48 may include any number and type of execution units (e.g., integer, floating point, vector).

CIF 62 may be coupled to L1 data cache 52, FED unit 42, MMU 60, and the L2 cache (not shown). CIF 62 may be configured to manage the interface between core 40 and the L2 cache. MMU 60 may include L2 TLB 61 and may be configured to perform address translation and memory management functions. In another embodiment, MMU 60 may include an additional prefetch unit (not shown), and this prefetch unit may be responsible for doing the table-walk for the next page in the prefetch stream. Then, this prefetched translation may be loaded into ITLB 45, data TLB (DTLB) 56, and/or L2 TLB 61.

LSU 50 may include L1 data cache 52, prefetch unit 54, and DTLB 56. LSU 50 may also be coupled to an L2 cache (not shown) via CIF 62. It is noted that LSU 50 may also include other components (e.g., load queue, store queue) not shown in FIG. 2. Prefetch unit 54 may be configured to generate prefetch requests so as to prefetch data into the L1 data cache 52. In one embodiment, prefetch unit 54 may be configured to concurrently maintain multiple separate, independent prefetch streams. A "prefetch stream" may refer to a stream of addresses and blocks associated with those addresses that are prefetched into the cache as a result of a detected prefetch pattern. The prefetch pattern may describe the difference between consecutive memory accesses in the prefetch stream. This difference between consecutive memory accesses may be referred to as the "stride" of the prefetch stream.

Prefetch unit 54 may monitor the load/store traffic through L1 data cache 52 and/or at other points in the core 40. Prefetch unit 54 may detect patterns of access in the load/store traffic and identify streams for prefetching. For each separate stream, prefetch unit 54 may detect unit stride patterns for prefetches, such as prefetches of consecutive blocks in memory, either in an increasing-address or decreasing-address direction. Other embodiments may detect more complex prefetch patterns, including larger strides and repeating patterns that are not a single fixed distance between memory accesses. Then, the detected training information may be propagated to the lower levels of the cache hierarchy.

Prefetch unit 54 may train on streams generated by core 40. Training may include detecting and analyzing the memory accesses associated with the various streams to determine information associated with the memory accesses. When prefetch unit 54 has trained on a stream, it may assign a stream identifier (ID) to the stream and store an entry in a prefetch table (not shown) with the stream ID. The entry may include attributes associated with the stream, such as temporality or non-temporality of data, stride, page size, memory access type, demand address, prefetch address, physical page number of the next page in memory, as well as other information.

Prefetch unit 54 may include a prefetch table having a plurality of entries for storing training information on a plurality of streams. A given prefetch stream may be assigned to one of the entries of the prefetch table, and generation of prefetches may be performed for that prefetch stream based on the contents of the entry. For example, the addresses of the prefetch request may be compared to the current address and/or the next expected address in the table entry.

For lower levels of the cache hierarchy, the prefetching may extend forward to prefetch further into the predicted memory locations of the stream. In one embodiment, there may be a start distance associated with each of the streams. The L1 prefetch unit may add a first start distance to the first prefetch request, and the L2 prefetch unit may add a second start distance on top of the first start distance. Lower level prefetch units (e.g., L3 prefetch unit) may add additional distances onto the prefetch request. In one embodiment, the start distance may be programmed locally at each prefetch unit. In another embodiment, the start distance may be sent to lower level prefetch units from prefetch unit 54.

Figure 4:
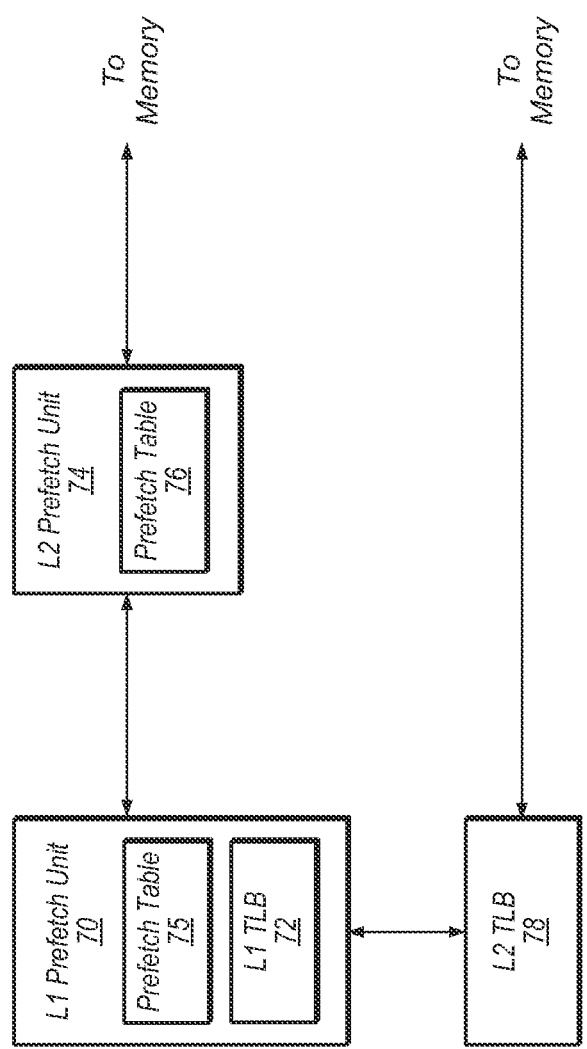
FIG. 4 is a block diagram of one embodiment of L1 and L2 prefetch units and TLBs.

Referring now to FIG. 4, a block diagram of one embodiment of L1 and L2 prefetch units and TLBs is shown. L1 prefetch unit 70 may be configured to track streams and generate prefetch requests for these streams. L1 prefetch unit 70 may include a prefetch table 75 for storing data associated with streams that have been trained. L2 prefetch unit 74 may include prefetch table 76, which may include much of the same information of prefetch table 75. L1 prefetch unit 70 may send information from prefetch table 75 to L2 prefetch unit 74 so that L2 prefetch unit 74 may populate its own prefetch table 76.

L1 prefetch unit 70 may send prefetch requests for a given stream to L2 prefetch unit 74. L2 prefetch unit 74 may be configured to stay ahead of L1 prefetch unit 70 in the given stream by a certain distance. L1 prefetch unit 70 may have access to the page translations for the virtual pages of the streams being fetched. These page translations may be stored in L1 TLB 72, and the page translations may provide a physical page number for a supplied virtual page number.

As L1 prefetch unit 70 generates prefetch requests for a given stream, L1 prefetch unit 70 may keep track of the position in the current page for the prefetch stream. When the prefetch stream reaches a programmable threshold location in the current page, L1 prefetch unit 70 may generate a zombie prefetch request to retrieve the next page's translation. This zombie prefetch request may be conveyed to L1 TLB 72 to prefetch the next page's physical page number. If the next page's translation is not stored in L1 TLB 72, the translation may be retrieved from L2 TLB 78 or from memory and then the translation may be sent back to L1 TLB 72. L1 TLB 72 may also send a notification to L1 prefetch unit 70 to indicate that the translation has been retrieved and stored in L1 TLB 72.

When the L1 prefetch unit 70 receives this signal, L1 prefetch unit 70 may retrieve the translation and send the translation to L2 prefetch unit 74. Preferably, the L2 prefetch unit 74 will not have already reached the page boundary of the current page prior to receiving this translation. The programmable threshold location may be chosen such that enough time is allowed for retrieving the translation and conveying the translation to L2 prefetch unit 74 before L2 prefetch unit 74 reaches the end of the current page.

When L2 prefetch unit 74 receives the physical page number of the next page, L2 prefetch unit 74 may store this physical page number in prefetch table 76. Prefetch table 76 may include multiple entries for multiple streams that are currently being prefetched by L2 prefetch unit 74. The physical page number may be stored in the prefetch table in an entry associated with the stream being prefetched. When L2 prefetch unit 74 reaches the end of the current page, L2 prefetch unit 74 may retrieve the physical page number of the next page from the corresponding entry. Then, L2 prefetch unit 74 may use the physical page number to keep prefetching for the stream and to stay ahead of L1 prefetch unit 70. This process may be repeated for each page that is fetched for the given stream. Also, this process may be performed for multiple streams that are being prefetched at the same time.

Figure 5:
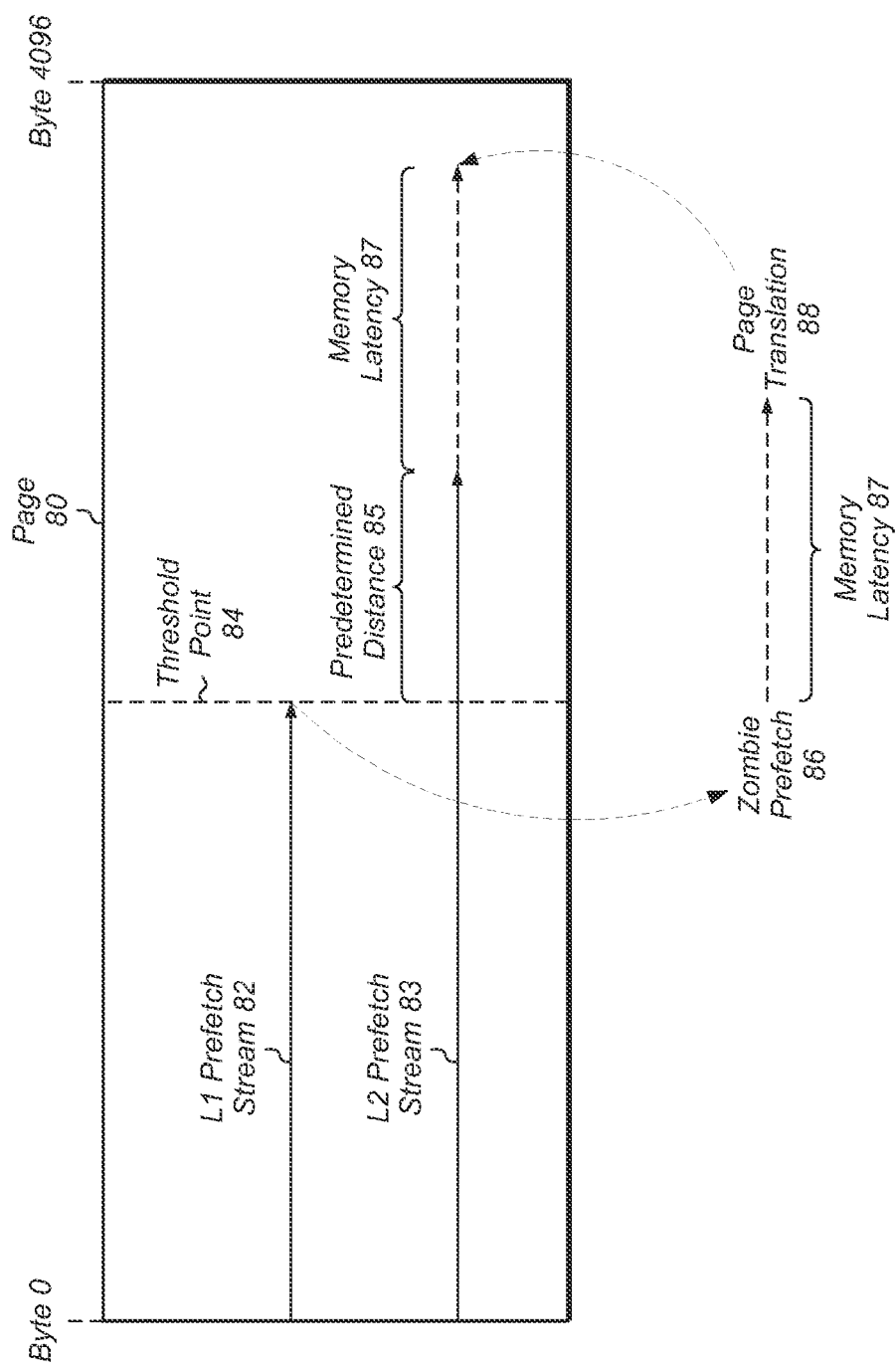
FIG. 5 illustrates one embodiment of the generation of a zombie prefetch.

Turning now to FIG. 5, one embodiment of the generation of a zombie prefetch is shown. Page 80 is representative of any size of page being traversed by a prefetch stream. In one embodiment, page 80 may be 4 kilobytes (KB). In other embodiments, page 80 may be any of various other sizes. L1 prefetch stream 82 is representative of a given stream being prefetched by a L1 prefetch unit (not shown) within a processor core (not shown). The point of the arrow representing L1 prefetch stream 82 may indicate the location of the most recent prefetch for the given stream within page 80. L2 prefetch stream 83 is representative of the same given stream being prefetched by a L2 prefetch unit. L2 prefetch stream 83 is ahead of L1 prefetch stream 82 in the given stream by predetermined distance 85, which may be a certain number of cache lines.

The L1 prefetch unit may be configured to monitor the location of the most recent prefetch within L1 prefetch stream 82, and when L1 prefetch stream 82 reaches threshold point 84, the L1 prefetch unit may trigger zombie prefetch 86. Although not shown in FIG. 5, L1 prefetch stream 82 may continue prefetching past threshold point 84 on page 80 while the translation requested by zombie prefetch 86 is being retrieved. The time that it is expected to take to retrieve page translation 88 is represented by memory latency 87. Memory latency 87 also represents the amount of time that L2 prefetch stream 83 will continue prefetching from page 80 while page translation 88 is being retrieved. Then, when page translation 88 is retrieved, it may be conveyed to the L2 prefetch unit. The dashed arrow from page translation 88 to the point of the dashed arrow of L2 prefetch stream 83 represents the sending of page translation 88 to the L2 prefetch unit. As shown, page translation 88 is sent to the L2 prefetch unit prior to L2 prefetch stream 83 reaching the end of page 80. This ensures that the L2 prefetch unit will be able to continue prefetching from the next physical page in memory when L2 prefetch stream 83 reaches the end of page 80.

The location of threshold point 84 within page 80 may vary depending on the embodiment. In one embodiment, threshold point 84 may be located at the midpoint of page 80. In addition, threshold point 84 may be programmable in various embodiments. Generally speaking, threshold point 84 may be located at a position within page 80 such that enough time is set aside to allow page translation 88 to be retrieved and conveyed to the lower level prefetch units prior to these lower level prefetch units reaching the end of page 80. In one embodiment, the L2 prefetch unit may be the lowest level prefetch unit. In another embodiment, a L3 prefetch unit may be the lowest level prefetch unit.

The L1 prefetch unit may base the triggering of zombie prefetch 86 on the number of cache lines that the lowest level prefetch unit is in front of the L1 prefetch unit (represented by predetermined distance 85) and on the expected memory latency needed to retrieve the page translation 88 (represented by memory latency 87). For example, in one embodiment, a L2 prefetch unit may be the lowest level prefetch unit, and L2 prefetch stream 83 may be 10 cache lines ahead of the L2 prefetch stream 82. So, in this example, predetermined distance 85 is 10 cache lines. Memory latency 87 may be calculated in terms of cache lines and this latency may be added to the 10 cache lines. For example, memory latency 87 may be calculated as a given number of clock cycles, and then the given number of clock cycles may be converted to a number of cache lines that would be fetched during the given number of clock cycles. Then, threshold point 84 may be chosen such that it is further back from the end of page 80 then the sum of memory latency 87 and predetermined distance 85 (i.e., 10 cache lines). In another embodiment, L2 prefetch stream 83 may be 15 cache lines ahead of L1 prefetch stream 82. Therefore, in this embodiment, threshold point 84 may be located 5 cache lines earlier in page 80 than for the previously described embodiment. In some embodiments, the location of threshold point 84 may be chosen so that the estimated time when page translation 88 is received is as close as possible to the lower level prefetch unit(s) reaching the end of page 80.

In some embodiments, the L1 prefetch unit may make sure it has a certain degree of confidence in the stream continuing down the same path before issuing the zombie prefetch 86. Also, in some embodiments, if the L1 prefetch unit determines that the stream has ended after issuing zombie prefetch 86, the L1 prefetch unit may prevent the translation from being conveyed to the L2 prefetch unit after it is retrieved from the TLB or memory.

Figure 6:
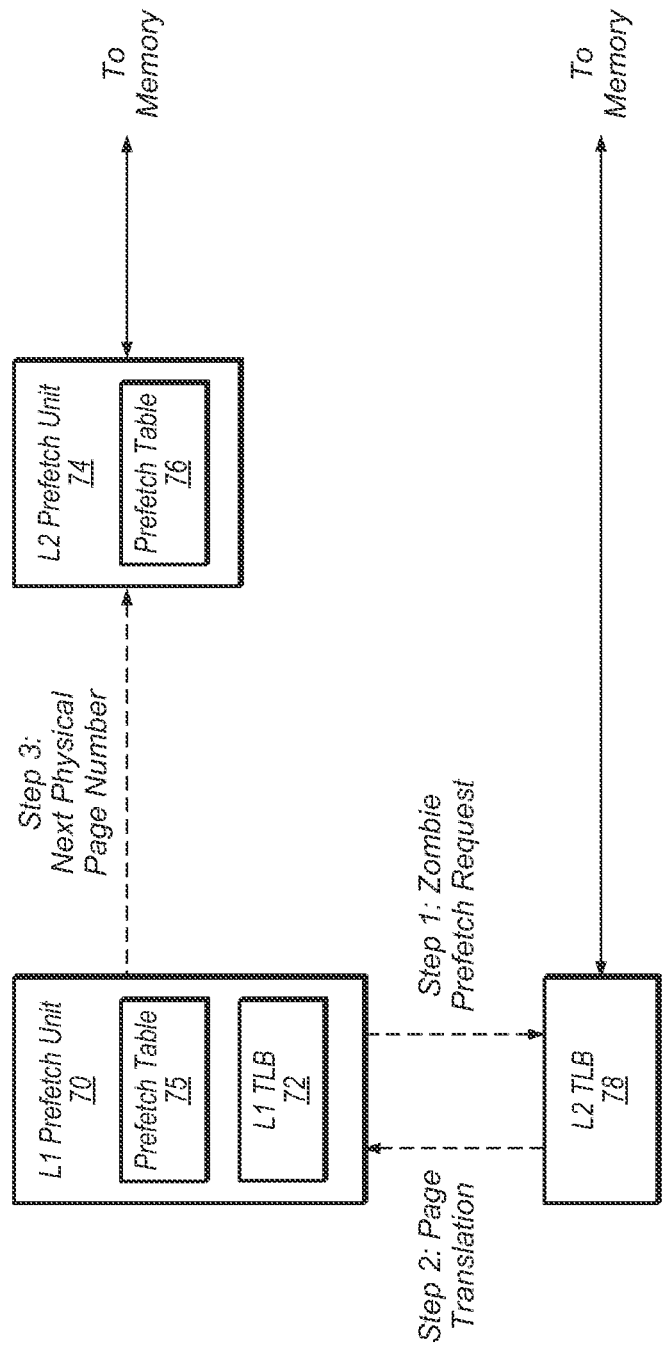
FIG. 6 is a block diagram of one embodiment of the steps of a zombie prefetch request.

Referring now to FIG. 6, a block diagram of one embodiment of the steps of a zombie prefetch request is shown. In one embodiment, the generation of a zombie prefetch request may be triggered by the detection of a prefetch stream passing a threshold point. The zombie prefetch request may include the virtual page address of the next page in the given stream. L1 prefetch unit 70 may take into consideration the stride of the stream and the direction of the stream (whether the stride is negative or positive) when computing the next virtual page address. In step one, the zombie prefetch request may be sent to L1 TLB 72 and completed in L1 TLB 72 if the translation is already stored in L1 TLB 72. If the zombie prefetch request is a miss in L1 TLB 72, then the request may be sent to L2 TLB 78. L1 TLB 72 and L2 TLB 78 may store a subset of the translations stored in one or more page tables. If the request misses in L2 TLB 78, then the address translation may be performed by a lookup of the page table stored in memory.

In step two, the page translation may be retrieved and sent to L1 prefetch unit 70. The page translation may also be stored in L1 TLB 72 and L2 TLB 78 if it was not already stored there. Then, in step three, the physical page number of the next page may be sent from L1 prefetch unit 70 to L2 prefetch unit 74. In another embodiment, if there is an additional lower level prefetch unit, such as a L3 prefetch unit, then the physical page number of the next page may also be sent to the L3 prefetch unit in step 3. L2 prefetch unit 74 may store the physical page number in an entry for the corresponding stream ID in prefetch table 76. Although not shown in FIG. 6, the next physical page number may traverse one or more components (e.g., MMU, CIF) between L1 prefetch unit 70 and L2 prefetch unit 74.

When L2 prefetch unit 74 reaches the boundary of a page for a given stream, L2 prefetch unit 74 may retrieve the physical page number of the next page from prefetch table 76 and resume prefetching from there. In this way, the stored physical page number may allow L2 prefetch unit 74 to stay ahead of L1 prefetch unit 70 for the given stream so that future requests will result in hits in the L2 cache.

Referring now to FIG. 7, one embodiment of a prefetch request is shown. Prefetch request 90 is representative of a regular prefetch request or a zombie request that may be sent from a L1 prefetch unit to one or more lower level prefetch units. Prefetch request 90 may include a physical page number field 92 to specify the physical page number of the current page of the given stream. For a zombie request, field 92 may specify the physical page number of the next page.

Field 94 may specify the line of the page to be prefetched. Field 96 may specify the stride of given stream. Field 98 may specify the ID of the given stream, and this stream ID may be used for indexing into the L2 prefetch training table. Field 100 may specify if the request is a zombie request. In this way, the L2 prefetch unit will be able to differentiate the zombie request from a regular prefetch request. For a zombie request, fields 94 and 96 may be zero or may store any values as these fields may be ignored for a zombie request. In other embodiments, the format of prefetch request 90 may include one or more other fields and/or omit one or more of the fields shown in FIG. 7.

Turning now to FIG. 8, one embodiment of a prefetch table is shown. Prefetch table 76 may be utilized to store information associated with various trained streams. Table 76 is representative of a table that may be utilized by the L2 prefetch unit or at any lower level prefetch units of the overall cache hierarchy. A L1 prefetch unit may also include a table similar to table 76. The number of entries in table 76 may vary depending on the embodiment, the maximum number of concurrent streams, as well as other information. In other embodiments, table 76 may include other information. In further embodiments, one or more of the attributes shown in table 76 may be omitted. Alternatively, one or more of the attributes shown in table 76 may be stored in another location of the corresponding prefetch unit.

Each entry of table 76 may include a plurality of attributes. A stream ID 102 may be included in each entry and may be utilized to identify the entry. The stream ID 102 may correspond to a respective stream ID that has been trained by a training mechanism in the core. The stride 104 may be the detected stride for the stream, and in one embodiment may be a number of lines. The temporality indicator 106 may be a bit that indicates if the stream corresponds to temporal or non-temporal data. The L2 cache and lower level caches may utilize temporality indicator 106 to bias the way selection in its LRU mechanism. The value of temporality indicator 106 may also affect replacement policy within a cache.

Another attribute stored in the entries of table 76 may be the page size attribute 108 (e.g., 64 KB, 128 KB, 1 MB). In one embodiment, a L2 prefetch unit (and lower level prefetch units) may use this attribute to determine the page boundaries. Each entry of table 76 may also include a stream type attribute 110 to indicate if the stream is a load stream or a store stream. In one embodiment, if the stream is a load stream, then the L2 prefetch unit may retrieve lines of data in a shared state. If the stream is a store stream, then the L2 prefetch unit may bring the data into the core in an exclusive state so that the core can modify the data.

Each entry in table 76 may also include a demand address 112 attribute and a prefetch address 114 attribute. When a L2 prefetch unit receives a prefetch request from a higher level cache, the L2 prefetch unit may store the address of the prefetch request in the demand address 112 attribute field. The L2 prefetch unit may store the current address being prefetched by the L2 prefetch unit in the prefetch address 114 attribute of the corresponding entry. When a L2 prefetch unit receives a prefetch request and packet, the L2 prefetch unit may compare the prefetch request address with the demand address 112 stored in table 76 for that particular stream ID. If the incoming prefetch request is ahead of the physical address stored in that entry, then the L2 prefetch unit may overwrite the demand address 112 attribute of the entry with the new address.

Table 76 may also include a next physical page number field 116. This field may be populated by a next physical page number sent with a zombie request. The L2 prefetch unit may identify a request as a zombie request if the zombie indicator bit is set. For a received zombie request, the L2 prefetch unit may retrieve the next physical page number from the request and store this value in field 116. Then, when the L2 prefetch unit reaches a page boundary, the L2 prefetch unit may retrieve the page number from field 116 and continue prefetching from this next page.

Figure 9:
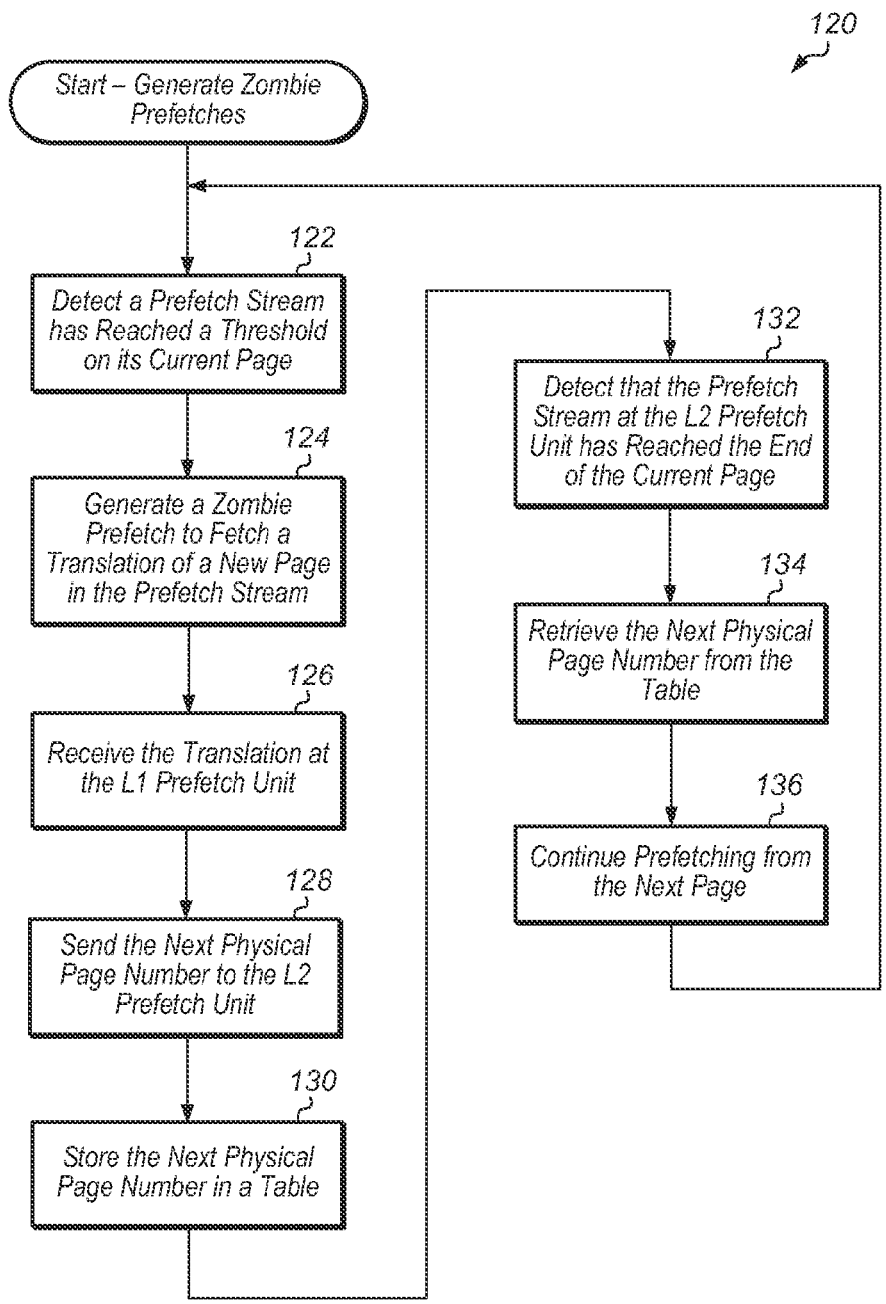
FIG. 9 is a generalized flow diagram illustrating one embodiment of a method for generating zombie prefetches.

Referring now to FIG. 9, one embodiment of a method 120 for generating zombie prefetches is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, an L1 prefetch unit may detect that a L1 prefetch stream for a given stream ID has reached a threshold point in the current page of memory being prefetched (block 122). In one embodiment, the threshold point may be the midpoint of the page. In other embodiments, the threshold point may be located at other points within the page and such a point may be programmable. In response to detecting the prefetch stream has passed the threshold point, a zombie prefetch may be generated by the L1 prefetch unit to fetch a translation of a new page in the prefetch stream (block 124). In one embodiment, the translation of the new page may be fetched from a TLB. If the translation for the next physical page number is not already stored in the TLB, then a table walk may be performed to retrieve the translation from memory.

Next, the L1 prefetch unit may receive the retrieved translation (block 126). After receiving the retrieved translation, the L1 prefetch unit may send the next physical page number to the L2 prefetch unit (block 128). Then, the L2 prefetch unit may store the next physical page number in a table (block 130). The next physical page number may be stored in an entry associated with the stream ID of the given stream.

Next, the L2 prefetch unit may detect that the L2 prefetch requests generated for the given stream have reached the end of the current physical page (block 132). In response to reaching the end of the page, the L2 prefetch unit may retrieve the next physical page number stored in the table (block 134). Then, the L2 prefetch unit may continue prefetching for the given stream from the next physical page (block 136). After block 136, the method may return to block 122 to wait until detecting a threshold has been passed for any of the streams being prefetched. It is noted that multiple streams may be in the process of being prefetched simultaneously, and multiple streams may be at various points within method 120 at any given time.

Figure 10:
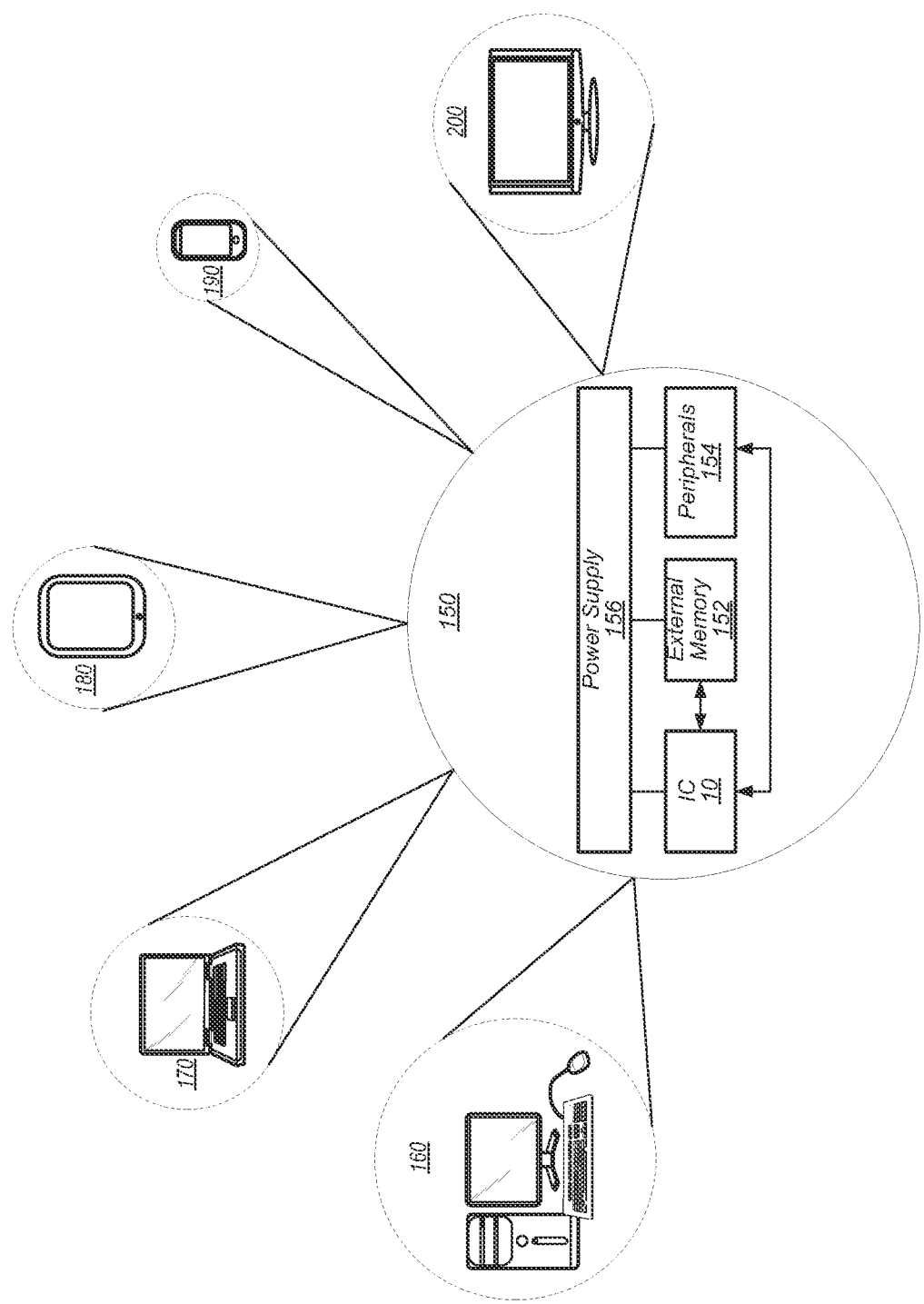
FIG. 10 is a block diagram of one embodiment of a system.

Turning now to FIG. 10, a block diagram of one embodiment of a system 150 is shown. As shown, system 150 may represent chip, circuitry, components, etc., of a desktop computer 160, laptop computer 170, tablet computer 180, cell phone 190, television 200 (or set top box configured to be coupled to a television), or otherwise. In the illustrated embodiment, the system 150 includes at least one instance of IC 10 (of FIG. 2) coupled to an external memory 152.

IC 10 is coupled to one or more peripherals 154 and the external memory 152. A power supply 156 is also provided which supplies the supply voltages to IC 10 as well as one or more supply voltages to the memory 152 and/or the peripherals 154. In various embodiments, power supply 156 may represent a battery (e.g., a rechargeable battery in a smart phone, laptop or tablet computer). In some embodiments, more than one instance of IC 10 may be included (and more than one external memory 152 may be included as well).

The memory 152 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 154 may include any desired circuitry, depending on the type of system 150. For example, in one embodiment, peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc.

Figure 11:
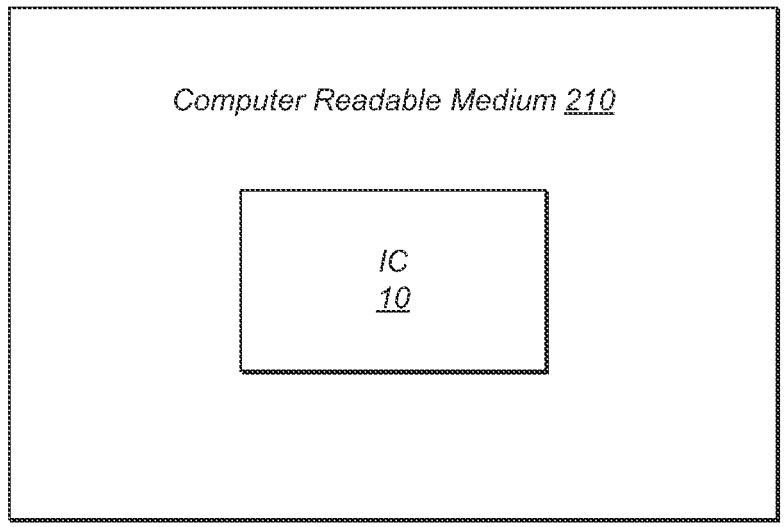
FIG. 11 is a block diagram of one embodiment of a computer readable medium.

Referring now to FIG. 11, one embodiment of a block diagram of a computer readable medium 210 including one or more data structures representative of the circuitry included in IC 10 (of FIG. 2) is shown. Generally speaking, computer readable medium 210 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 210 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 210 may be the netlist(s) (with or without the synthesis library) or the data set(s), as desired. In yet another alternative, the data structures may comprise the output of a schematic program, or netlist(s) or data set(s) derived therefrom. While computer readable medium 210 includes a representation of IC 10, other embodiments may include a representation of any portion or combination of portions of IC 10 (e.g., processor complex 20, CPU 22, L2 cache 30).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a cache hierarchy comprising a plurality of levels of caches; and a plurality of prefetch units including a first prefetch unit and a second prefetch unit;

wherein the first prefetch unit of the plurality of prefetch units is configured to request an address translation for a new page corresponding to a given prefetch stream responsive to reaching a threshold location of a current page; and wherein the second prefetch unit is configured to:
maintain a prefetch table comprising a plurality of entries, wherein each entry comprises a stream ID;
receive a physical page number of the new page from the first prefetch unit;
store the physical page number of the new page in a corresponding entry in the prefetch table; and
prefetch data corresponding to the new page based on the address translation for the new page.

2. The processor as recited in claim 1, wherein the first prefetch unit is a level one (L1) prefetch unit, wherein the second prefetch unit is a level two (L2) prefetch unit, and wherein the L2 prefetch unit is configured to generate prefetches a predetermined distance ahead of the L1 prefetch unit in the given prefetch stream.

3. The processor as recited in claim 2, further comprising a translation lookaside buffer (TLB), and wherein the L1 prefetch unit is configured to request the address translation for the new page in the given prefetch stream from the TLB.

4. The processor as recited in claim 2, wherein the cache hierarchy comprises at least a level one (L1) cache and a level two (L2) cache.

5. The processor as recited in claim 2, wherein the L1 prefetch unit is configured to:
generate prefetch requests, wherein each prefetch request comprises an indicator which specifies whether the prefetch request includes the physical page number of the new page corresponding to the given prefetch stream; and
convey the prefetch requests to the L2 prefetch unit.

6. The processor as recited in claim 1, wherein each prefetch request includes a stream identifier (ID) to identify a corresponding prefetch stream.

7. The processor as recited in claim 6, wherein:
each entry comprises a plurality of attributes associated with a corresponding prefetch stream; and
the physical page number corresponds to a given prefetch stream.

8. The processor as recited in claim 7, wherein the second prefetch unit is further configured to:
retrieve the stored physical page number of the new page responsive to reaching a page boundary of the current page in the given prefetch stream; and
continue prefetching in the new page for the given prefetch stream using the stored physical page number.

9. A method comprising:
generating prefetches corresponding to a first stream identifier (ID) in a level one (L1) prefetch unit;
preloading a translation for a next virtual page responsive to detecting the prefetches corresponding to the first stream ID have reached a threshold location in a current page;
sending the translation to a lower level prefetch unit;
storing the translation in a table at the lower level prefetch unit in an entry associated with the first stream ID; and
generating an address of a prefetch request for a next page based on the page translation, responsive to reaching a page boundary of the current page.

10. The method as recited in claim 9, wherein the lower level prefetch unit is a level two (L2) prefetch unit.

11. The method as recited in claim 9, wherein the lower level prefetch unit is a level three (L3) prefetch unit.

12. The method as recited in claim 9, wherein the threshold location in the current page is determined based on a memory latency associated with retrieving the translation for the next virtual page.

13. The method as recited in claim 12, wherein the threshold location in the current page is determined based on a distance by which the lower level prefetch unit is ahead of the L1 prefetch unit for the first stream ID.

14. The method as recited in claim 9, wherein the threshold location in the current page is programmable.

15. A method comprising:
generating prefetch requests for a first stream identifier (ID) at a level one (L1) prefetch unit;
sending the prefetch requests to a level two (L2) prefetch unit; and
sending a physical page number of a next page to the L2 prefetch unit prior to the L2 prefetch unit reaching a page boundary of a current page for the first stream ID.

16. The method as recited in claim 15, wherein prior to sending the physical page number of the next page to the L2 prefetch unit, the method further comprising:
requesting a translation of a next virtual page accessed by the first stream ID, responsive to detecting the prefetch requests at the L1 prefetch unit have reached a threshold location in the current page;
storing the translation in a level one (L1) translation lookaside buffer (TLB) responsive to receiving the translation from a level two (L2) TLB.

17. The method as recited in claim 16, wherein the request for the translation of the next virtual page is sent to the L2 TLB.

18. The method as recited in claim 15, further comprising:
receiving the physical page number of the next page at the L2 prefetch unit; and
storing the physical page number of the next page in a table in an entry for the first stream ID.

19. The method as recited in claim 18, further comprising:
retrieving the physical page number of the next page from the table responsive to reaching the page boundary of the current page for the first stream ID; and
continuing to generate prefetches for the first stream ID using the physical page number of the next page.

20. An apparatus comprising:
a plurality of prefetch units;
one or more translation lookaside buffers (TLBs); and
a plurality of levels of caches;
wherein a level one (L1) prefetch unit is configured to:
generate a request for a translation of a next virtual page for a given stream, wherein the request is generated prior to a level two (L2) prefetch unit reaching a boundary of a current page for the given stream;
convey the request to a TLB;
receive a translation of the next virtual page for the given stream, wherein the translation comprises a physical page number of the next page in the given stream; and
convey the physical page number of the next page to the L2 prefetch unit.

21. The apparatus as recited in claim 20, wherein the L2 prefetch unit is configured to receive and store the physical page number of the next page.

22. The apparatus as recited in claim 21, wherein the L2 prefetch unit is further configured to continue generating prefetches across the boundary of the current page by utilizing the stored physical page number of the next page.

23. The apparatus as recited in claim 22, wherein the request is conveyed to a level two (L2) TLB, and wherein the L2 TLB is configured to retrieve the translation and convey the translation to a level one (L1) TLB.

24. A method comprising:
- generating prefetches corresponding to a first stream identifier (ID) in a level one (L1) prefetch unit;
- preloading a translation for a next virtual page responsive to detecting the prefetches corresponding to the first stream ID have reached a threshold location in a current page, wherein the threshold location in the current page is determined based on a memory latency associated with retrieving the translation for the next virtual page;
- sending the translation to a lower level prefetch unit;
- storing the translation in a table at the lower level prefetch unit; and
- generating an address of a prefetch request for a next page using the page translation, responsive to reaching a page boundary of the current page.

* * * * *